United States Patent
Giessmann et al.

(10) Patent No.: US 12,081,143 B2
(45) Date of Patent: Sep. 3, 2024

(54) CONVERTER DEVICE HAVING A CONVERTER AND HAVING A CONTROL DEVICE

(71) Applicants: SEMIKRON ELEKTRONIK GMBH & CO. KG, Nuremberg (DE); SEMIKRON ELECTRONICS (ZHUHAI) CO., LTD., Zhuhai (CN)

(72) Inventors: Andreas Giessmann, Shanghai (CN); Christopher Schmidt, Schwabach (DE)

(73) Assignees: SEMIKRON ELEKTRONIK GMBH & CO. KG, Nuremberg (DE); SEMIKRON ELECTRONICS (ZHUHAI) CO., LTD., Zhuhai (CN)

( * ) Notice: Subject to any disclaimer, the term of this patent is extended or adjusted under 35 U.S.C. 154(b) by 197 days.

(21) Appl. No.: 17/818,248

(22) Filed: Aug. 8, 2022

(65) Prior Publication Data
US 2023/0052362 A1 Feb. 16, 2023

(30) Foreign Application Priority Data
Aug. 13, 2021 (CN) .......................... 202110931778.4

(51) Int. Cl.
H02M 7/487 (2007.01)
H02M 1/34 (2007.01)

(52) U.S. Cl.
CPC ........... *H02M 7/487* (2013.01); *H02M 1/346* (2021.05)

(58) Field of Classification Search
CPC .............................. H02M 7/487; H02M 7/483
See application file for complete search history.

(56) References Cited

U.S. PATENT DOCUMENTS

| | | | |
|---|---|---|---|
| 2015/0214856 A1* | 7/2015 | Nakashima | H02M 7/537 363/131 |
| 2021/0050797 A1* | 2/2021 | Xu | G01R 19/175 |
| 2021/0384817 A1* | 12/2021 | Stickelmann | H02M 1/36 |
| 2023/0216426 A1* | 7/2023 | Xu | H02M 7/487 363/131 |

FOREIGN PATENT DOCUMENTS

EP 3301804 A1 4/2018

* cited by examiner

*Primary Examiner* — Alex Torres-Rivera
(74) *Attorney, Agent, or Firm* — Andrew F. Young; NOLTE LACKERBACH SIEGEL

(57) ABSTRACT

A converter device has a converter that has power semiconductor switches and has a control device that is designed to drive the power semiconductor switches. The control device is designed to drive the power semiconductor switches so that electrical switching losses occurring in the converter are reduced during use.

17 Claims, 10 Drawing Sheets

CONVERTER DEVICE HAVING A CONVERTER AND HAVING A CONTROL DEVICE

CROSS REFERENCE TO RELATED APPLICATIONS

This application relates to and claims priority to CN 202110931778.4 filed Aug. 13, 2021, the entire contents of which are incorporated herein fully by reference.

FIGURE SELECTED FOR PUBLICATION

FIG. 1

BACKGROUND OF THE INVENTION

Field of the Invention

The invention relates to a converter device having a converter that has a first, second, third, fourth, fifth and sixth power semiconductor switch, which each have a first and a second load current connection, and having a control device that is designed to drive the power semiconductor switches, wherein the second load current connection of the first power semiconductor switch is electrically conductively connected to the first load current connection of the fifth power semiconductor switch and to the first load current connection of the second power semiconductor switch, wherein the second load current connection of the fifth power semiconductor switch is electrically conductively connected to the first load current connection of the sixth power semiconductor switch, wherein the second load current connection of the sixth power semiconductor switch is electrically conductively connected to the first load current connection of the fourth power semiconductor switch and to the second load current connection of the third power semiconductor switch, wherein the second load current connection of the second power semiconductor switch is electrically conductively connected to the first load current connection of the third power semiconductor switch, wherein the converter has a first diode electrically connected in antiparallel with the first power semiconductor switch, a second diode electrically connected in antiparallel with the second power semiconductor switch, a third diode electrically connected in antiparallel with the third power semiconductor switch, a fourth diode electrically connected in antiparallel with the fourth power semiconductor switch, a fifth diode electrically connected in antiparallel with the fifth power semiconductor switch, a sixth diode electrically connected in antiparallel with the sixth power semiconductor switch and an AC potential connection that is electrically conductively connected, at a central circuit node, to the second load current connection of the second power semiconductor switch and to the first load current connection of the third power semiconductor switch.

Description of the Related Art

Conventionally, a converter device is known from EP 3 301 804 A1. In order to reduce switching losses, according to FIG. 14 and the associated description of EP 3 301 804 A1, use is made of both possible neutral current paths of the converter to channel the output current of the converter. According to FIG. 14 and the associated description of EP 3 301 804 A1, the power semiconductor switches S3 and S5 and also S2 and S6 are in this case switched synchronously with one another, resulting in relatively high switching losses occurring therein.

Aspects and Objects of the Invention

One alternative object or aspect of the present invention is to specify a converter device having a converter that has power semiconductor switches and a control device, wherein electrical switching losses occurring in the converter are reduced.

This object is achieved by a converter device having a converter that has a first, second, third, fourth, fifth and sixth power semiconductor switch, which each have a first and a second load current connection, and having a control device that is designed to drive the power semiconductor switches, wherein the second load current connection of the first power semiconductor switch is electrically conductively connected to the first load current connection of the fifth power semiconductor switch and to the first load current connection of the second power semiconductor switch, wherein the second load current connection of the fifth power semiconductor switch is electrically conductively connected to the first load current connection of the sixth power semiconductor switch, wherein the second load current connection of the sixth power semiconductor switch is electrically conductively connected to the first load current connection of the fourth power semiconductor switch and to the second load current connection of the third power semiconductor switch, wherein the second load current connection of the second power semiconductor switch is electrically conductively connected to the first load current connection of the third power semiconductor switch, wherein the converter has a first diode electrically connected in antiparallel with the first power semiconductor switch, a second diode electrically connected in antiparallel with the second power semiconductor switch, a third diode electrically connected in antiparallel with the third power semiconductor switch, a fourth diode electrically connected in antiparallel with the fourth power semiconductor switch, a fifth diode electrically connected in antiparallel with the fifth power semiconductor switch, a sixth diode electrically connected in antiparallel with the sixth power semiconductor switch and an AC potential connection that is electrically conductively connected, at a central circuit node, to the second load current connection of the second power semiconductor switch and to the first load current connection of the third power semiconductor switch, wherein, during operation of the converter, the central circuit node has an output voltage with respect to the second load current connection of the fifth power semiconductor switch and an output current flows from the central circuit node to the AC potential connection in a current metering direction, wherein the control device is designed to drive the power semiconductor switches such that;

the first, fifth, sixth and fourth power semiconductor switch are switched on and off at a higher frequency than the second and third power semiconductor switch, wherein the control device is designed, starting from a first converter basic switching state in which the output voltage is positive, the output current is negative and the output current flows through the first and second diode, to put the converter into a second converter basic switching state by at least switching on the fifth power semiconductor switch and switching on the third power semiconductor switch temporally thereafter, in which the fifth and third power semiconductor switch are switched on and a first portion of the output current flows through the second diode and through the fifth power semiconductor switch and a second portion of the output current flows through the sixth diode and through the third power semiconductor switch, and wherein the control device is designed, starting from the second converter basic switching state, to put the converter into the first converter basic switching state by switching off the third power semiconductor switch and at least switching off the fifth power semiconductor switch temporally thereafter.

According to another alternative aspect or object of the present invention there is an advantage when the control device is designed, starting from the first converter basic switching state, to put the converter into a second converter basic switching state by at least switching on the fifth power semiconductor switch, by then switching on the sixth power semiconductor switch and by switching on the third power semiconductor switch temporally thereafter, in which the fifth, sixth and third power semiconductor switch are switched on and a first portion of the output current flows through the second diode and through the fifth power semiconductor switch and a second portion of the output current flows through the sixth diode and through the third power semiconductor switch. Electrical switching losses occurring in the converter are thereby further reduced.

In this connection, it proves to be advantageous when the control device is designed, starting from the second converter basic switching state, to put the converter into the first converter basic switching state by switching off the third power semiconductor switch, by then switching off the sixth power semiconductor switch and by at least switching off the fifth power semiconductor switch temporally thereafter. Electrical switching losses occurring in the converter are thereby further reduced.

It furthermore proves to be advantageous when the first, fifth, sixth and fourth power semiconductor switch are structured so as to have smaller switching losses than the second and third power semiconductor switch. Electrical switching losses occurring in the converter are thereby further reduced.

It furthermore proves to be advantageous when the semiconductor material from which the first, fifth, sixth and fourth power semiconductor switch are formed is formed from silicon carbide or gallium nitride and the semiconductor material from which the second and third power semiconductor switch are formed is formed from silicon. Electrical switching losses occurring in the converter are thereby further reduced.

It furthermore proves to be advantageous when the semiconductor material from which the first, fifth, sixth and fourth diode are formed is formed from silicon carbide or gallium nitride and the semiconductor material from which the second and third diode are formed is formed from silicon. Electrical switching losses occurring in the converter are thereby further reduced.

It furthermore proves to be advantageous when the first, fifth, sixth and fourth power semiconductor switches are designed as MOSFETs and the second and third power semiconductor switch are designed as IGBTs. Electrical switching losses occurring in the converter are thereby further reduced.

It furthermore proves to be advantageous when the converter has a first and a second snubber capacitor, wherein a first connection of the first snubber capacitor is electrically conductively connected to the first load current connection of the first power semiconductor switch and a second connection of the first snubber capacitor is electrically conductively connected to the second load current connection of the fifth power semiconductor switch, wherein a first connection of the second snubber capacitor is electrically conductively connected to the first load current connection of the sixth power semiconductor switch and a second connection of the second snubber capacitor is electrically conductively connected to the second load current connection of the fourth power semiconductor switch. Undesired high-frequency electrical oscillations and/or overvoltages occurring during operation of the converter are thereby able to be reduced.

Another alternative object and aspect of the present invention is achieved by a converter device having a converter that has a first, second, third, fourth, fifth and sixth power semiconductor switch, which each have a first and a second load current connection, and having a control device that is designed to drive the power semiconductor switches, wherein the second load current connection of the first power semiconductor switch is electrically conductively connected to the first load current connection of the fifth power semiconductor switch and to the first load current connection of the second power semiconductor switch, wherein the second load current connection of the fifth power semiconductor switch is electrically conductively connected to the first load current connection of the sixth power semiconductor switch, wherein the second load current connection of the sixth power semiconductor switch is electrically conductively connected to the first load current connection of the fourth power semiconductor switch and to the second load current connection of the third power semiconductor switch, wherein the second load current connection of the second power semiconductor switch is electrically conductively connected to the first load current connection of the third power semiconductor switch, wherein the converter has a first diode electrically connected in antiparallel with the first power semiconductor switch, a second diode electrically connected in antiparallel with the second power semiconductor switch, a third diode electrically connected in antiparallel with the third power semiconductor switch, a fourth diode electrically connected in antiparallel with the fourth power semiconductor switch, a fifth diode electrically connected in antiparallel with the fifth power semiconductor switch, a sixth diode electrically connected in antiparallel with the sixth power semiconductor switch and an AC potential connection that is electrically conductively connected, at a central circuit node, to the second load current connection of the second power semiconductor switch and to the first load current connection of the third power semiconductor switch, wherein, during operation of the converter, the central circuit node has an output voltage with respect to the second load current connection of the fifth power semiconductor switch and an output current flows from the central circuit node to the AC potential connection in a current metering direction, wherein the control device is designed to drive the power semiconductor switches such that;

the second and third power semiconductor switch are switched on and off at a higher frequency than the first, fifth, sixth and fourth power semiconductor switch, wherein the control device is designed, starting from a first converter basic switching state in which the output voltage is positive, the output current is negative and the output current flows through the first and second diode, to put the converter into a second converter basic switching state by at least switching on the third power semiconductor switch and switching on the fifth power semiconductor switch temporally thereafter, in which the fifth and third power semiconductor switch are switched on and a first portion of the output current flows through the second diode and through the fifth power semiconductor switch and a second portion of the output current flows through the sixth diode and through the third power semiconductor switch, wherein the control device is designed, starting from the second converter basic switching state, to put the converter into the first converter basic switching state by switching off the fifth power semiconductor switch and by switching off the third power semiconductor switch at least temporally thereafter.

It proves to be advantageous when the control device is designed, starting from the first converter basic switching state, to put the converter into a second converter basic switching state by at least switching on the third power semiconductor switch, by subsequently switching on the second power semiconductor switch and by then switching on the fifth power semiconductor switch, in which the second, fifth and third power semiconductor switch are switched on and a first portion of the output current flows through the second diode and through the fifth power semiconductor switch and a second portion of the output current flows through the sixth diode and through the third power semiconductor switch. Electrical switching losses occurring in the converter are thereby further reduced.

In this connection, it proves to be advantageous when the control device is designed, starting from the second converter basic switching state, to put the converter into the first converter basic switching state by switching off the fifth power semiconductor switch, by then switching off the second power semiconductor switch and by at least then switching off the third power semiconductor switch. Electrical switching losses occurring in the converter are thereby further reduced.

It furthermore proves to be advantageous when the second and third power semiconductor switch have smaller switching losses than the first, fifth, sixth and fourth power semiconductor switch. Electrical switching losses occurring in the converter are thereby further reduced.

It furthermore proves to be advantageous when the semiconductor material from which the second and third power semiconductor switch are formed is formed from silicon carbide or gallium nitride and the semiconductor material from which the first, fifth, sixth and fourth power semiconductor switch are formed is formed from silicon. Electrical switching losses occurring in the converter are thereby further reduced.

It furthermore proves to be advantageous when the semiconductor material from which the second and third diode are formed is formed from silicon carbide or gallium nitride and the semiconductor material from which the first, fifth, sixth and fourth diode are formed is formed from silicon. Electrical switching losses occurring in the converter are thereby further reduced.

It furthermore proves to be advantageous when the first, fifth, sixth and fourth power semiconductor switches are designed as IGBTs and the second and third power semiconductor switch are designed as MOSFETs. Electrical switching losses occurring in the converter are thereby further reduced.

The respective first, second, third, fourth, fifth and sixth diode may, as in the exemplary embodiments, be designed as a discrete component or be integrated into the semiconductor body of the respective power semiconductor switch connected in antiparallel with the respective diode. If the respective power semiconductor switch is designed for example as a MOSFET, the respective diode may thus also be designed as an intrinsic diode of the MOSFET.

It is pointed out that the semiconductor material from which the first, second, third, fourth, fifth and sixth power semiconductor switch are formed may be formed for example from silicon, silicon carbide or gallium nitride, and that the semiconductor material from which the first, second, third, fourth, fifth and sixth diode are formed may be formed for example from silicon, silicon carbide or gallium nitride.

It is furthermore pointed out that snubber capacitors, unlike intermediate circuit capacitors that serve to buffer-store energy, serve to reduce undesired high-frequency electrical oscillations and/or overvoltages, and generally have a substantially lower capacitance than intermediate circuit capacitors.

The above and other aspects, features, objects, and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
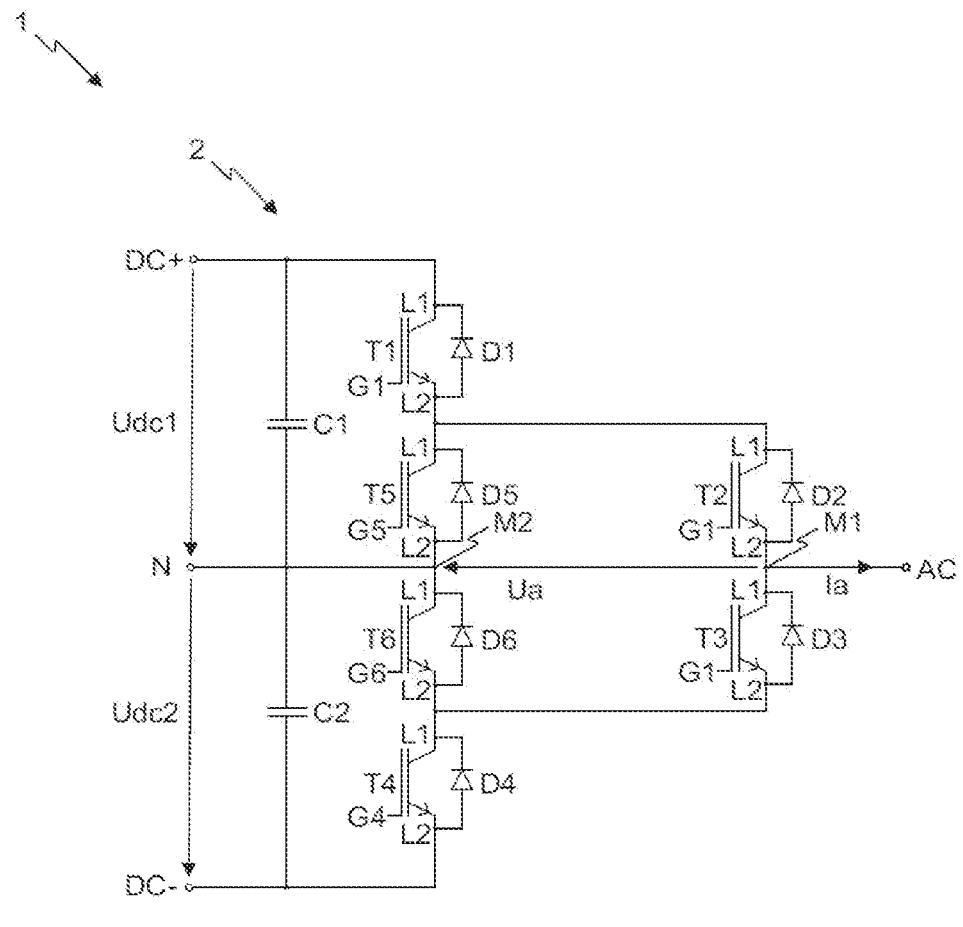
FIG. 1 shows a converter device according to one adaptive and alternative aspect of the invention having a converter and a control device.
Figure 1:
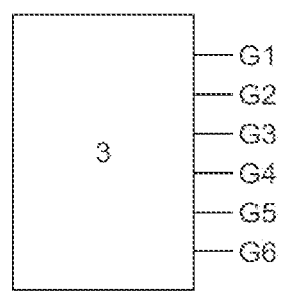

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

FIG. 1 illustrates a converter device 1 according to the invention having a converter 2 and having a control device 3.

The converter 2 has a first, second, third, fourth, fifth and sixth power semiconductor switch T1, T2, T3, T4, T5 and T6 that each have a first and a second load current connection L1 and L2. The second load current connection L2 of the first power semiconductor switch T1 is electrically conductively connected to the first load current connection L1 of the fifth power semiconductor switch T5 and to the first load current connection L1 of the second power semiconductor switch T2. The second load current connection L2 of the fifth power semiconductor switch T5 is electrically conductively connected to the first load current connection L1 of the sixth power semiconductor switch T6. The second load current connection L2 of the sixth power semiconductor switch T6 is electrically conductively connected to the first load current connection L1 of the fourth power semiconductor switch T4 and to the second load current connection L2 of the third power semiconductor switch T3. The second load current connection L2 of the second power semiconductor switch T2 is electrically conductively connected to the first load current connection L1 of the third power semiconductor switch T3.

The converter 2 furthermore has a first diode D1 electrically connected in antiparallel with the first power semiconductor switch T1, a second diode D2 electrically connected in antiparallel with the second power semiconductor switch T2, a third diode D3 electrically connected in antiparallel with the third power semiconductor switch T3, a fourth diode D4 electrically connected in antiparallel with the fourth power semiconductor switch T4, a fifth diode D5 electrically connected in antiparallel with the fifth power semiconductor switch T5, a sixth diode D6 electrically connected in antiparallel with the sixth power semiconductor switch T6 and an AC potential connection AC that is electrically conductively connected, at a central circuit node M1, to the second load current connection L2 of the second power semiconductor switch T2 and to the first load current connection L1 of the third power semiconductor switch T3.

During operation of the converter 2, the central circuit node M1 has an output voltage Ua with respect to the second load current connection L2 of the fifth power semiconductor switch T5 and an output current Ia flows from the central circuit node M1 to the AC potential connection AC in a current metering direction.

The converter 2 furthermore has a positive potential connection DC+ that is electrically conductively connected to the first load current connection L1 of the first power semiconductor switch T1, a negative potential connection DC− that is electrically conductively connected to the second load current connection L2 of the fourth power semiconductor switch T4 and a neutral potential connection N that is electrically conductively connected, at a further central circuit node M2, to the second load current connection L2 of the fifth power semiconductor switch T5 and to the first load current connection L1 of the sixth power semiconductor switch T6. The converter 2 as such has an ANPC circuit topology.

During operation of the converter 2, a first DC voltage Udc1 is present between the positive potential connection DC+ or the first load current connection L1 of the first power semiconductor switch T1 and the neutral potential connection N or the second load current connection L2 of the fifth power semiconductor switch T5 and a second DC voltage Udc2 is present between the neutral potential connection N or the first load current connection L1 of the sixth power semiconductor switch T6 and the second load current connection L2 of the fourth power semiconductor switch T4. By appropriately switching the power semiconductor switches T1, T2, T3, T4, T5 and T6 on and off, the AC potential connection AC is able to be electrically conductively connected to the first or second DC voltage connection DC+ or DC− or to the neutral potential connection N.

The first, fifth, sixth and fourth power semiconductor switch T1, T5, T6 and T4 are preferably structured so as to have smaller switching losses than the second and third power semiconductor switch T2 and T3.

The semiconductor material from which the first, fifth, sixth and fourth power semiconductor switch T1, T5, T6 and T4 are formed is preferably formed from silicon carbide or gallium nitride and the semiconductor material from which the second and third power semiconductor switch T2 and T3 are formed is preferably formed from silicon.

The semiconductor material from which the first, fifth, sixth and fourth diode D1, D5, D6 and D4 are formed is preferably formed from silicon carbide or gallium nitride and the semiconductor material from which the second and third diode D2 and D3 are formed is preferably formed from silicon.

The first, fifth, sixth and fourth power semiconductor switch T1, T5, T6 and T4 are preferably designed as MOSFETs and the second and third power semiconductor switch T2 and T3 are preferably designed as IGBTs.

In the exemplary embodiments, the respective T1, T2, T3, T4, T5 or T6 is designed as an IGBT, wherein the respective first load current connection L1 is designed as collector connection and the respective second load current connection L2 is designed as emitter connection and the respective control connection G1, G2, G3, G4, G5 and G6 is designed as gate connection.

The converter 2 preferably has a first and a second snubber capacitor C1 and C2. A first connection of the first snubber capacitor C1 is electrically conductively connected to the first load current connection L1 of the first power semiconductor switch T1 and a second connection of the first snubber capacitor C1 is electrically conductively connected to the second load current connection L2 of the fifth power semiconductor switch T5. A first connection of the second snubber capacitor C2 is electrically conductively connected to the first load current connection L1 of the sixth power semiconductor switch T6 and a second connection of the second snubber capacitor C2 is electrically conductively connected to the second load current connection L2 of the fourth power semiconductor switch T4.

The control device 3 is designed to drive the power semiconductor switches T1, T2, T3, T4, T5 and T6. To this end, the control device 3 has outputs that are electrically conductively connected to control connections G1, G2, G3, G4, G5 and G6 of the power semiconductor switches T1, T2, T3, T4, T5 and T6. The control device 3 generates drive signals for driving the power semiconductor switches T1, T2, T3, T4, T5 and T6, in more specific terms for switching the power semiconductor switches T1, T2, T3, T4, T5 and T6 on and off.

The control device 3 is designed to drive the power semiconductor switches T1, T2, T3, T4, T5 and T6 such that
the first, fifth, sixth and fourth power semiconductor switch T1, T5, T6, T4 are switched on and off at a higher frequency than the second and third power semiconductor switch T2 and T3.

Figure 2:
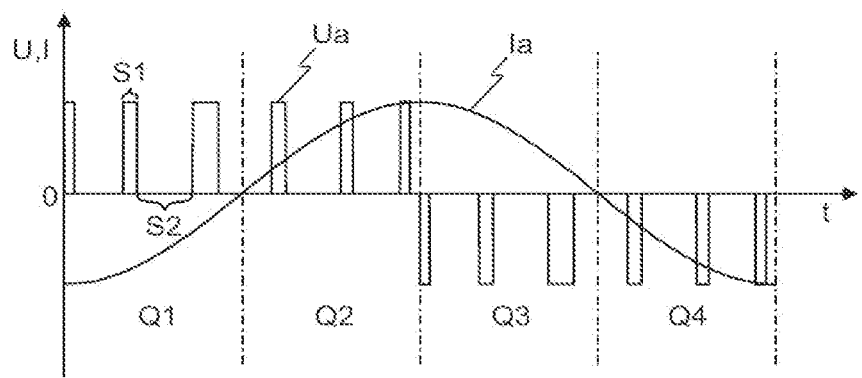
FIG. 2 shows profiles of an output voltage and of an output current of a converter of a converter device according to the invention.

FIG. 2 illustrates the temporal profiles of the output voltage Ua on and of the output current Ia over one period of the sinusoidal output current Ia, illustrated in idealized form, these temporal profiles occurring in the context of the exemplary embodiments, wherein time is denoted t, voltage is denoted U and current is denoted I. An inductive load, such as for example an electric motor, is connected in this case to the AC potential connection AC. The power semiconductor switches T1, T2, T3, T4, T5 and T6 are driven through pulse width modulation by the control device 3 or 3' (see FIG. 1 and FIG. 9). This results in four quadrants Q1, Q2, Q3 and Q4 whose boundaries, illustrated in dashed form, are located at the two current zero crossings and at the current maximum and current minimum of the output current Ia.

FIGS. 3 to 8 and 10 to 17 illustrate the switching states of the power semiconductor switches T1, T2, T3, T4, T5 and T6 that occur in the first quadrant Q1, wherein the switching symbols of the power semiconductor switches T1, T2, T3, T4, T5 and T6 switched on in the respective switching state are illustrated using bold lines and of the power semiconductor switches T1, T2, T3, T4, T5 and T6 optionally switched on in the respective switching state are illustrated using circles. The switching symbol of a power semiconductor switch that is additionally switched on in the respective switching state, in the context of one advantageous development of the invention, is likewise illustrated using bold lines. The continuous profile 4, respectively routed through the converter 2 or 2', of the output current Ia is furthermore also illustrated, wherein, when the continuous profile 4 intersects the bold switching symbol of the power semiconductor switch that is currently switched on, the output current Ia flows through this power semiconductor switch and, when the continuous profile 4 is illustrated in a manner routed between the reference sign of the diode and the switching symbol of the diode, the output current Ia flows through this diode. The output current Ia in the first quadrant Q1 flows in the opposite direction to the current metering direction, such that the output current Ia is negative.

Figure 3:
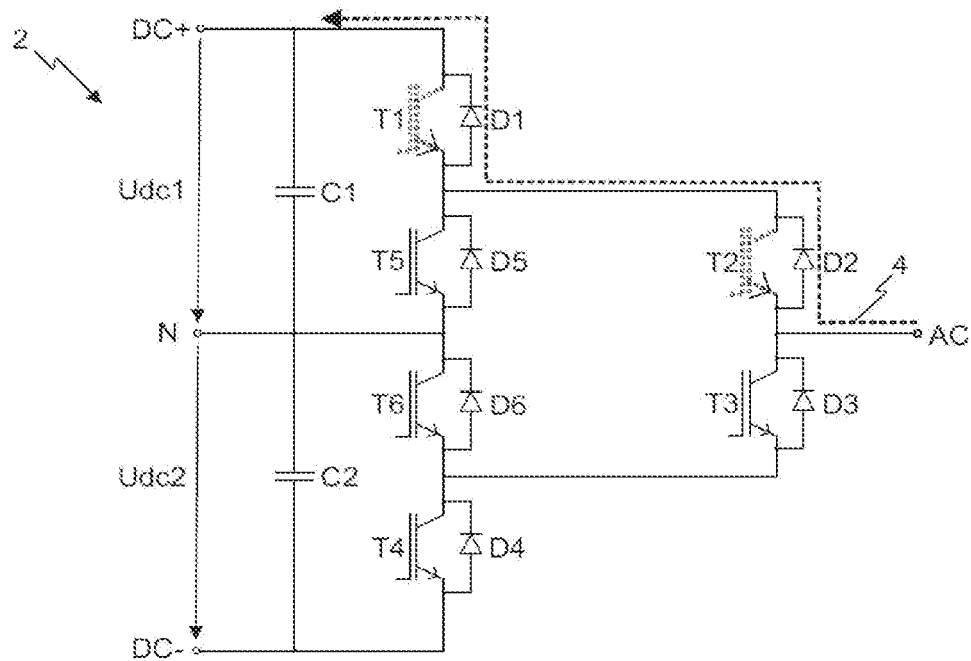
FIG. 3 shows a switching state of the converter according to FIG. 1.
Figure 4:
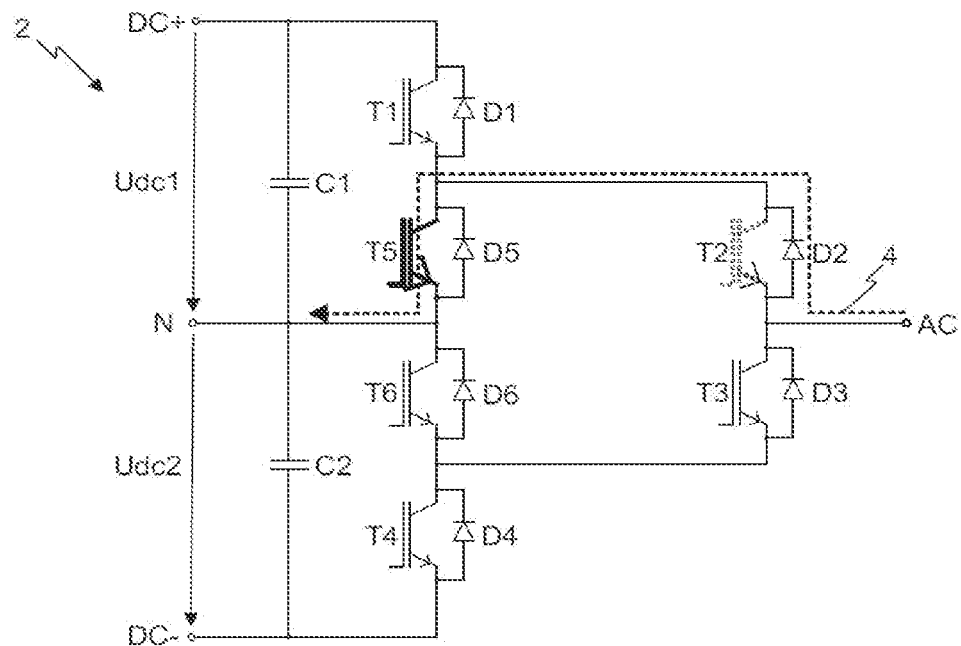
FIG. 4 shows a further switching state of the converter according to FIG. 1.
Figure 5:
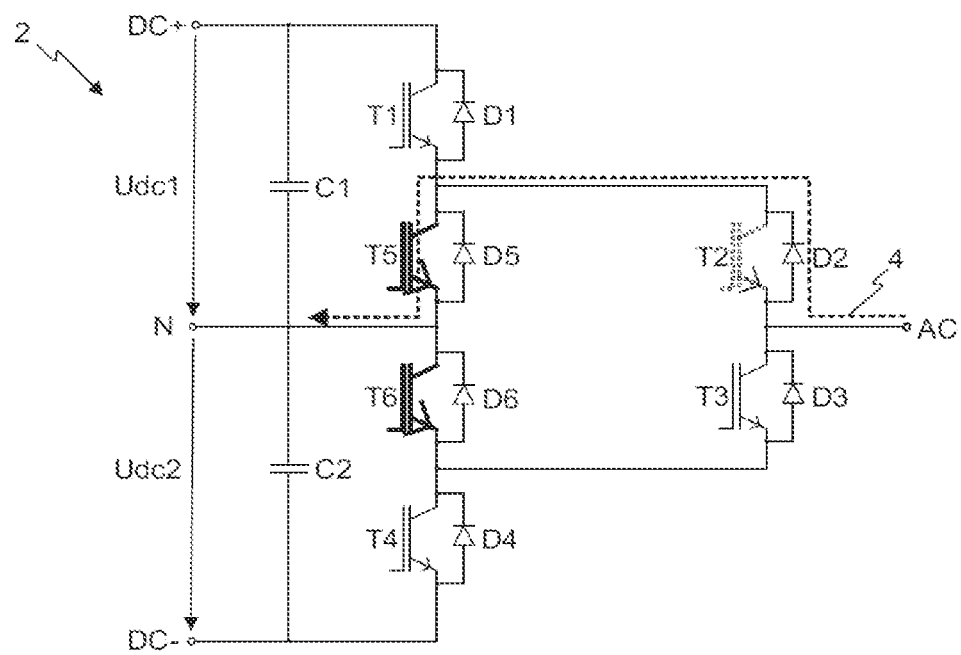
FIG. 5 shows a further switching state of the converter according to FIG. 1.
Figure 6:
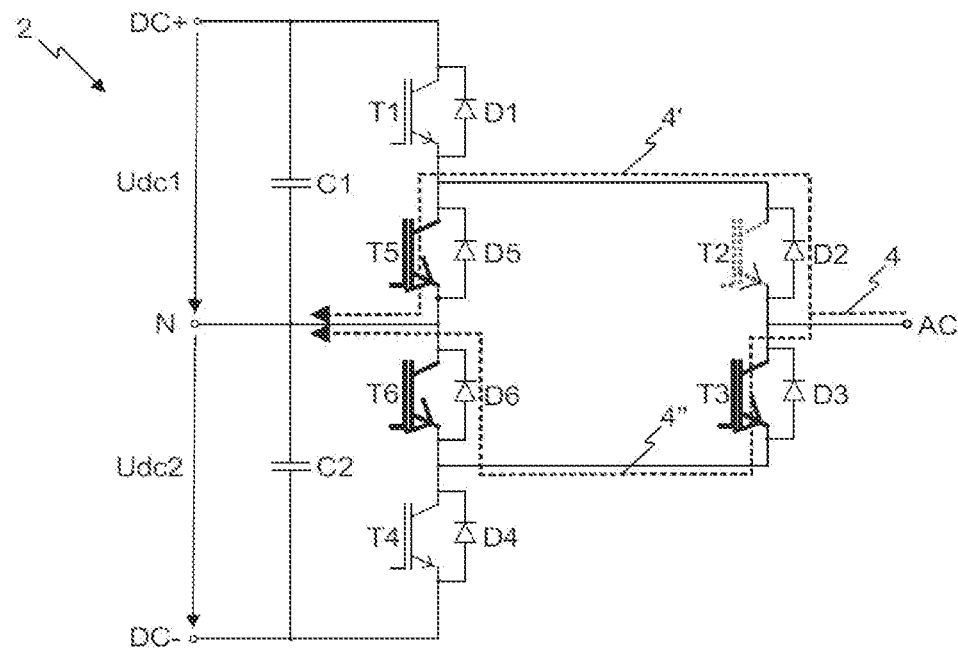
FIG. 6 shows a further switching state of the converter according to FIG. 1.
Figure 7:
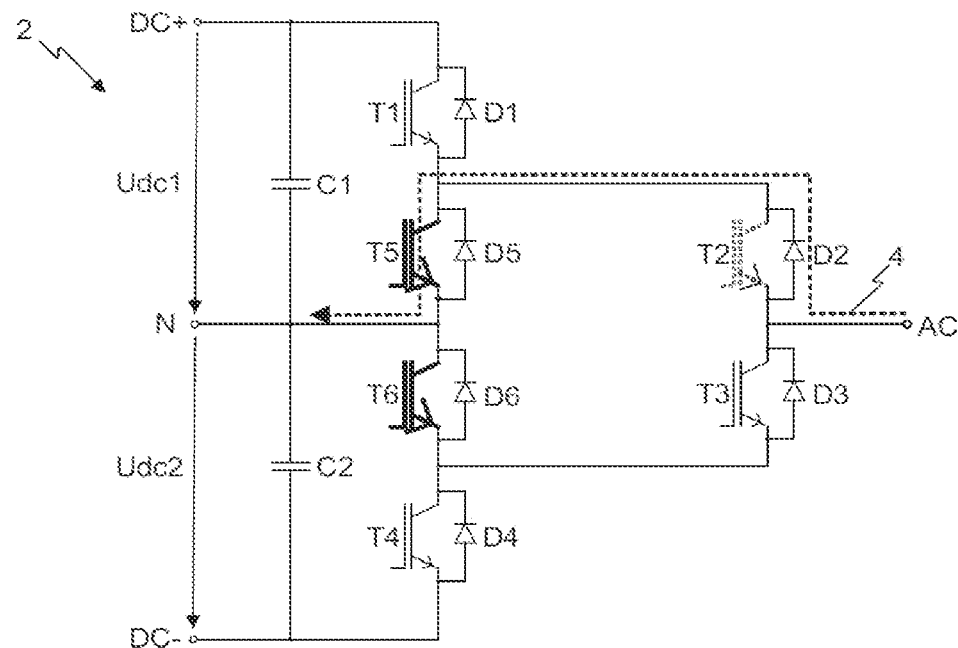
FIG. 7 shows a further switching state of the converter according to FIG. 1.
Figure 8:
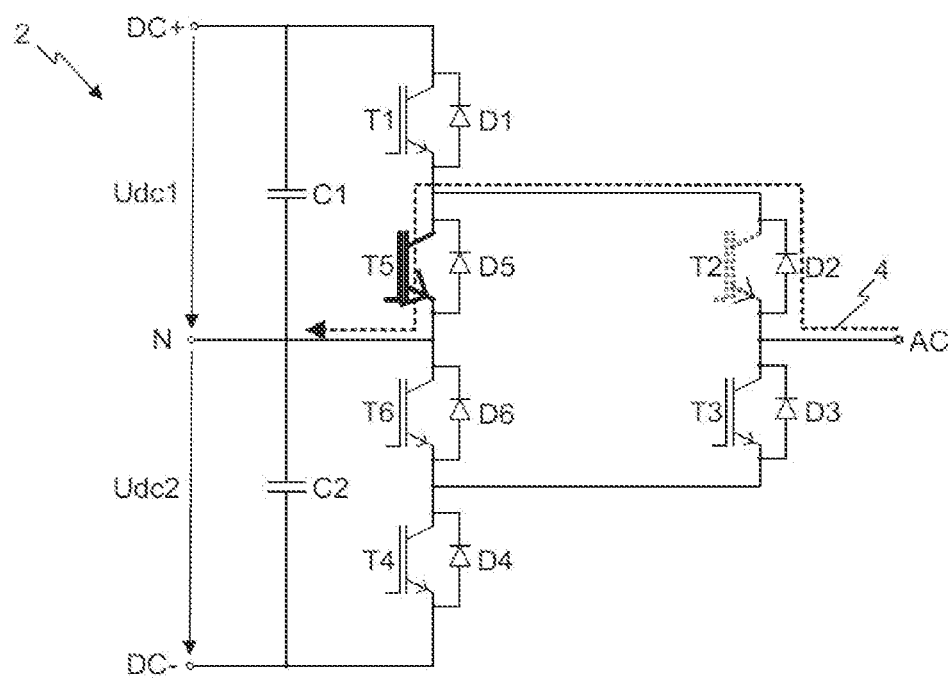
FIG. 8 shows a further switching state of the converter according to FIG. 1.

The switching state illustrated in FIG. 3 is a first converter basic switching state that is present in the first quadrant Q1 in the time periods S1 (output voltage Ua has a high positive value), and the switching state illustrated in FIG. 6 is a second converter basic switching state that is present in the first quadrant Q1 in the time periods S2 (output voltage Ua has an idealized value of zero or of approximately zero). The switching states illustrated in FIG. 4 and FIG. 5 are transition states that occur in the transition from the first to the second converter basic switching state. The switching states illustrated in FIG. 7 and FIG. 8 are transition switching states that occur in the transition from the second to the first converter basic switching state. The durations of the converter basic switching states are generally far longer than the durations of the transition switching states, and so the time periods of the transition switching states are not illustrated in FIG. 2.

The control device 3 is designed, starting from a first converter basic switching state (see switching state according to FIG. 3) in which the output voltage (Ua) is positive, the output current Ia is negative and the output current Ia flows through the first and second diode, to put the converter 2 into a second converter basic switching state (see switching state according to FIG. 6) by at least switching on the fifth power semiconductor switch T5 (this results in the switching state according to FIG. 4) and switching on the third power semiconductor switch T3 temporally thereafter, in which the fifth and third power semiconductor switch T5 and T3 are switched on and a first portion (4') of the output current Ia flows through the second diode D2 and through the fifth power semiconductor switch T5 and a second portion 4" of the output current Ia flows through the sixth diode D6 and through the third power semiconductor switch T3.

The first and second power semiconductor switch T1 and T2 may optionally be switched on in the first converter basic switching state. In this case, the first power semiconductor switch T1 is additionally switched off immediately before the fifth power semiconductor switch T5 is switched on.

In contrast to EP 3 301 804 A1, in which the third and fifth power semiconductor switch S3 and S5 are switched in temporal synchronicity and are thus switched on at the same time, in the invention, the fifth power semiconductor switch T5 is switched firstly in time and only then is the third power semiconductor switch T3 switched on by the control device 3. To this end, the control device 3 generates the drive signal for the control connection G3 for switching on the third power semiconductor switch T3 temporally after the drive signal for the control connection G5 for switching on the fifth power semiconductor switch T5. Switching losses occurring in the transition from the first to the second converter basic switching state are thereby reduced.

Switching losses occurring in the transition from the first to the second converter basic switching state may be even further reduced by virtue of the control device 3 being designed, starting from the first converter basic switching state (see FIG. 3), to put the converter 2 into a second converter basic switching state (see to FIG. 6) by at least switching on the fifth power semiconductor switch T5 (this results in the switching state according to FIG. 4), by then switching on the sixth power semiconductor switch (T6) (this results in the switching state according to FIG. 5) and by switching on the third power semiconductor switch (T3) temporally thereafter, in which the fifth, sixth and third power semiconductor switch T5, T6, T3 are switched on and a first portion 4' of the output current Ia flows through the second diode D2 and through the fifth power semiconductor switch T5 and a second portion 4" of the output current Ia flows through the sixth diode D6 and through the third power semiconductor switch T3.

In this advantageous development of the invention, after the fifth power semiconductor switch T5 has been switched on, the sixth power semiconductor switch T6 is switched on and then the third power semiconductor switch T3 is switched on. The sixth power semiconductor switch T6 is switched on virtually without switching losses, since no current flows through the sixth power semiconductor switch T6 other than the small and short load current that flows through the sixth power semiconductor switch T6 during charging of the blocking layer capacitance of the fourth power semiconductor switch T4. After the sixth power semiconductor switch T6 has been switched on, only a small voltage is present across the third power semiconductor switch T3, and so the third power semiconductor switch T3 is thereafter likewise switched on virtually without switching losses.

The control device 3 is furthermore designed, starting from the second converter basic switching state (see FIG. 6), to put the converter 2 into the first converter basic switching state (see FIG. 3) by switching off the third power semiconductor switch T3 (this results in the switching state according to FIG. 7), by then switching off the sixth power semiconductor switch T6 (this results in the switching state according to FIG. 8) and by at least switching off the fifth power semiconductor switch T5 temporally thereafter. If the first power semiconductor switch T1 is switched on in the first converter basic switching state, the first power semiconductor switch T1 is additionally switched on by the control device 3 immediately after the fifth power semiconductor switch T5 has been switched off.

In contrast to EP 3 301 804 A1, in which the third and fifth power semiconductor switch S3 and S5 are switched in temporal synchronicity and are thus switched off at the same time, in the invention, the third power semiconductor switch T3 is switched off firstly in time and the fifth power semiconductor switch T5 is switched off thereafter by the control device 3. To this end, the control device 3 generates the drive signal for the control connection G3 for switching off the third power semiconductor switch T3 temporally before the drive signal for the control connection G5 for switching off the fifth power semiconductor switch T5. Switching losses occurring in the transition from the second to the first converter basic switching state are thereby reduced.

Switching losses occurring in the transition from the second to the first converter basic switching state may be even further reduced, if the sixth power semiconductor switch T6 has been switched on as described above in the transition from the first to the second converter basic switching state, by virtue of the control device 3 being designed, starting from the second converter basic switching state (see FIG. 6), to put the converter 2 into the first converter basic switching state (see FIG. 3) by switching off the third power semiconductor switch T3 (this results in the switching state according to FIG. 7), by then switching off the sixth power semiconductor switch T6 (this results in the switching state according to FIG. 8) and by switching off the fifth power semiconductor switch T5 at least temporally thereafter.

In this advantageous development of the invention, after the third power semiconductor switch T3 has been switched off, the sixth power semiconductor switch T6 is switched off and then the fifth power semiconductor switch T5 is switched off. The third power semiconductor switch T3 is switched off virtually without switching losses, since virtually no voltage is present across the third power semiconductor switch T3 when it is switched off. The sixth power semiconductor switch T6 is switched off virtually without switching losses, since no current flows through the sixth power semiconductor switch T6 when it is switched off. The sixth diode D6 is also switched off virtually without electrical losses, since the sixth power semiconductor switch T6 keeps the voltage present across the sixth diode D6 at virtually zero, while the third power semiconductor switch T3 switches off the current flowing through the sixth diode D6.

The switching procedures in the other quadrants, that is to say in the second, third and fourth quadrants Q2, Q3 and Q4, from the respective first converter basic switching state to the respective second converter basic switching state and back take place in the same way as described above with regard to the first quadrant Q1, and so the respective switching procedures according to the invention are described only briefly and without figures below for the second, third and fourth quadrants Q2, Q3 and Q4.

The control device 3 is also designed, with regard to the second, third and fourth quadrants Q2, Q3 and Q4, to drive the power semiconductor switches T1, T2, T3, T4, T5 and T6 such that the first, fifth, sixth and fourth power semiconductor switch T1, T5, T6, T4 are switched on and off at a higher frequency than the second and third power semiconductor switch T2 and T3.

The control device 3 is designed, starting from a first converter basic switching state in which the output voltage Ua is positive, the output current Ia is positive, the first and second power semiconductor switch T1 and T2 are switched on and the output current Ia flows through the first and second power semiconductor switch T1 and T2, to put the converter 2 into a second converter basic switching state by at least switching off the first power semiconductor switch T1 and switching on the sixth power semiconductor switch T6 temporally thereafter, in which the second and sixth power semiconductor switch T2 and T6 are switched on and a first portion of the output current Ia flows through the fifth diode D5 and through the second power semiconductor switch T2 and a second portion of the output current Ia flows through the third diode D3 and through the sixth power semiconductor switch T6. Preferably, in order to reduce the switching losses in the sixth power semiconductor switch T6, after the first power semiconductor switch T1 has been switched off, the third power semiconductor switch T3 is switched on before the sixth power semiconductor switch T6 is switched on. The fifth power semiconductor switch T5 may optionally additionally be switched on immediately after the first power semiconductor switch T1 has been switched off. The control device 3 is furthermore designed, starting from the second converter basic switching state, to put the converter 2 into the first converter basic switching state by switching off the sixth power semiconductor switch T6 and at least switching on the first power semiconductor switch T1 temporally thereafter. If the fifth power semiconductor switch T5 is switched on, this is switched off immediately before the first power semiconductor switch T1 is switched on. If the third power semiconductor switch T3 has been switched on in the transition from the first converter basic switching state to the second converter basic switching state, as described above, in order to reduce switching losses, the third power semiconductor switch T3 is preferably switched off after the sixth power semiconductor switch T6 has been switched off and before the first power semiconductor switch T1 is switched on, and in particular before the fifth power semiconductor switch T5 is switched off.

The design of the control device 3 and the switching states for the third quadrant Q3, in which the output voltage Ua is negative and the output current Ia is positive, correspond in the same way, in mirror-image form, to the design of the control device 3 and the switching states for the first quadrant Q1, in which the output voltage Ua is positive and the output current Ia is negative. In the description given above with regard to the design of the control device 3 and with regard to the switching states for the first quadrant Q1, therefore, only the first power semiconductor switch T1 and the first diode D1 need to be swapped for the fourth power semiconductor switch T4 and the fourth diode D4, the fifth power semiconductor switch T5 and the fifth diode D5 need to be swapped for the sixth power semiconductor switch T6 and the sixth diode D6, and the second power semiconductor switch T2 and the second diode D2 need to be swapped for the third power semiconductor switch T3 and the third diode D3. With regard to the description of the design of the control device 3 and of the switching states for the third quadrant Q3, reference is thus made to the description of the design of the control device 3 and of the switching states for the first quadrant Q1 in order to avoid similar duplicated descriptions.

The design of the control device 3 and of the switching states for the fourth quadrant Q4, in which the output voltage Ua is negative and the output current Ia is negative, correspond in the same way, in mirror-image form, to the design of the control device 3 and the switching states for the second quadrant Q2, in which the output voltage Ua is positive and the output current Ia is positive. In the description given above with regard to the design of the control device 3 and with regard to the switching states for the second quadrant Q2, therefore, only the first power semiconductor switch T1 and the first diode D1 need to be swapped for the fourth power semiconductor switch T4 and the fourth diode D4, the fifth power semiconductor switch T5 and the fifth diode D5 need to be swapped for the sixth power semiconductor switch T6 and the sixth diode D6, and the second power semiconductor switch T2 and the second diode D2 need to be swapped for the third power semiconductor switch T3 and the third diode D3. With regard to the description of the design of the control device 3 and of the switching states for the fourth quadrant Q4, reference is thus made to the description of the design of the control device 3 and of the switching states for the second quadrant Q2 in order to avoid similar duplicated descriptions.

Figure 9:
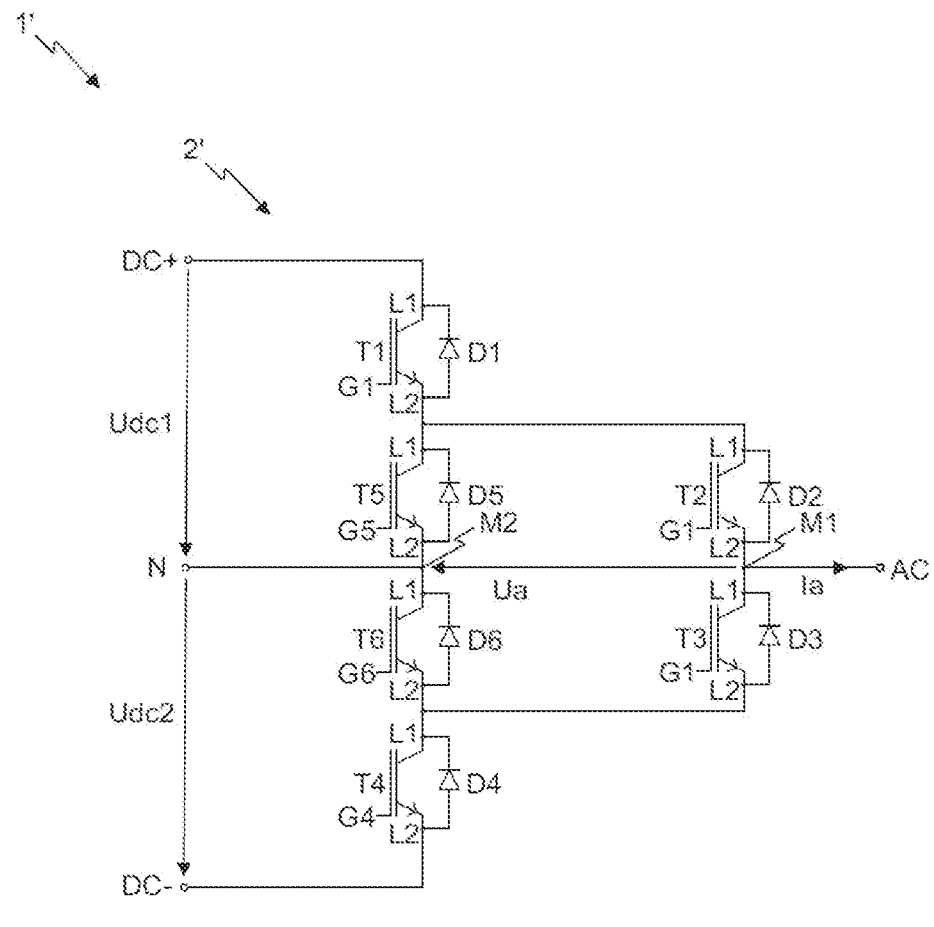
FIG. 9 shows a further converter device according to the invention having a converter and a control device.
Figure 9:
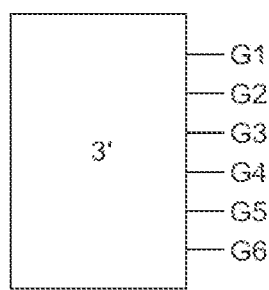

FIG. 9 illustrates a further converter device 1' according to the invention having a converter 2' and having a control device 3'.

The circuit topology of the converter 2' according to FIG. 9 matches the circuit topology of the converter 2 according to FIG. 1 apart from the feature, preferably present in the converter 2, of the two snubber capacitors C1 and C2, such that, with regard to the circuit topology of the converter 2', reference is made to the description of the circuit topology of the converter 2.

During operation of the converter 2', a first DC voltage Udc1 is present between the positive potential connection DC+ or the first load current connection L1 of the first power semiconductor switch T1 and the neutral potential connection N or the second load current connection L2 of the fifth power semiconductor switch T5 and a second DC voltage Udc2 is present between the neutral potential connection N or the first load current connection L1 of the sixth power semiconductor switch T6 and the second load current connection L2 of the fourth power semiconductor switch T4. By appropriately switching the power semiconductor switches T1, T2, T3, T4, T5 and T6 on and off, the AC potential connection AC is able to be electrically conductively connected to the first or second DC voltage connection DC+ or DC- or to the neutral potential connection N.

The second and third power semiconductor switch T2 and T3 preferably have smaller switching losses than the first, fifth, sixth and fourth power semiconductor switch T1, T5, T6 and T4.

The semiconductor material from which the second and third power semiconductor switch T2 and T3 are formed is preferably formed from silicon carbide or gallium nitride and the semiconductor material from which the first, fifth, sixth and fourth power semiconductor switch T1, T5, T6 and T4 are formed is preferably formed from silicon.

The semiconductor material from which the second and third diode D2 and D3 are formed is preferably formed from silicon carbide or gallium nitride and the semiconductor material from which the first, fifth, sixth and fourth diode D1, D5, D6 and D4 are formed is preferably formed from silicon.

The first, fifth, sixth and fourth power semiconductor switch T1, T5, T6 and T4 are preferably designed as IGBTs and the second and third power semiconductor switch T2 and T3 are preferably designed as MOSFETs.

In the exemplary embodiment, the respective T1, T2, T3, T4, T5 or T6 is designed as an IGBT, wherein the respective first load current connection L1 is designed as collector connection and the respective second load current connection L2 is designed as emitter connection.

The control device 3' is designed to drive the power semiconductor switches T1, T2, T3, T4, T5 and T6. To this end, the control device 3' has outputs that are electrically conductively connected to control connections G1, G2, G3, G4, G5 and G6 of the power semiconductor switches T1, T2, T3, T4, T5 and T6, which are designed here as gate connections. The control device 3' generates drive signals for driving the power semiconductor switches T1, T2, T3, T4, T5 and T6, in more specific terms for switching the power semiconductor switches T1, T2, T3, T4, T5 and T6 on and off.

Unlike the control device 3, the control device 3' is designed to drive the power semiconductor switches T1, T2, T3, T4, T5 and T6 such that the second and third power semiconductor switch T2 and T3 are switched on and off at a higher frequency than the first, fifth, sixth and fourth power semiconductor switch T1, T5, T6 and T4.

Figure 10:
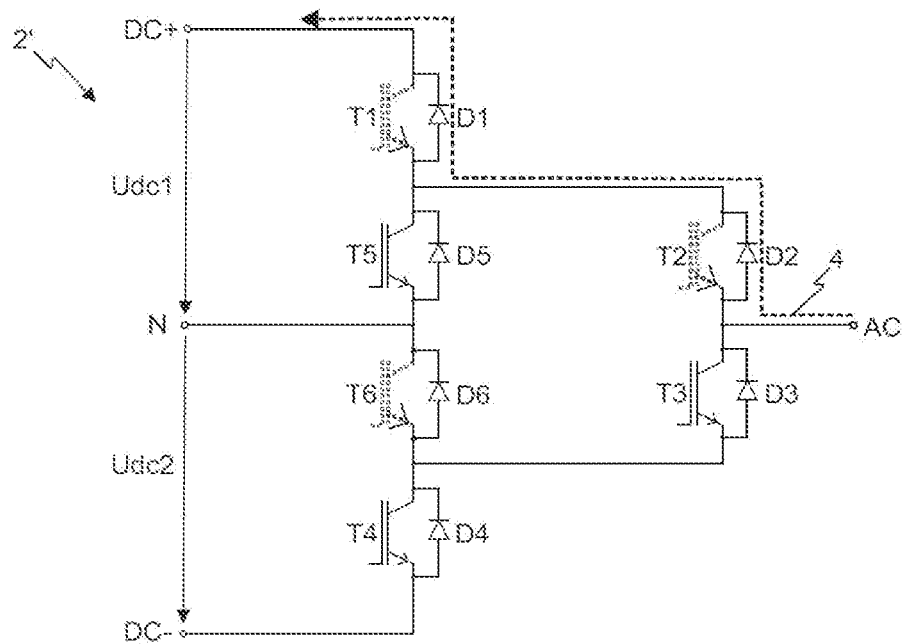
FIG. 10 shows a switching state of the converter according to FIG. 9.
Figure 11:
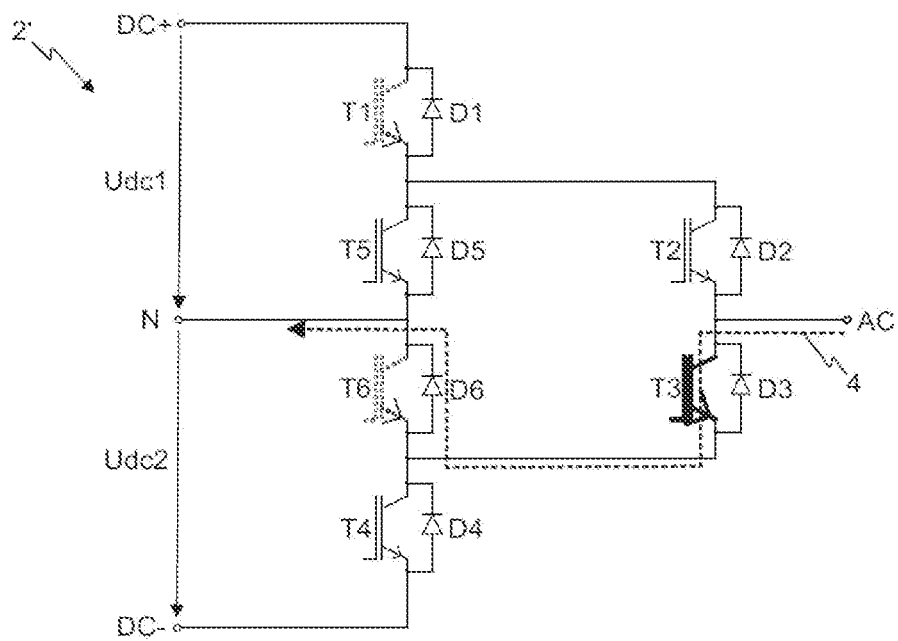
FIG. 11 shows a further switching state of the converter according to FIG. 9.
Figure 12:
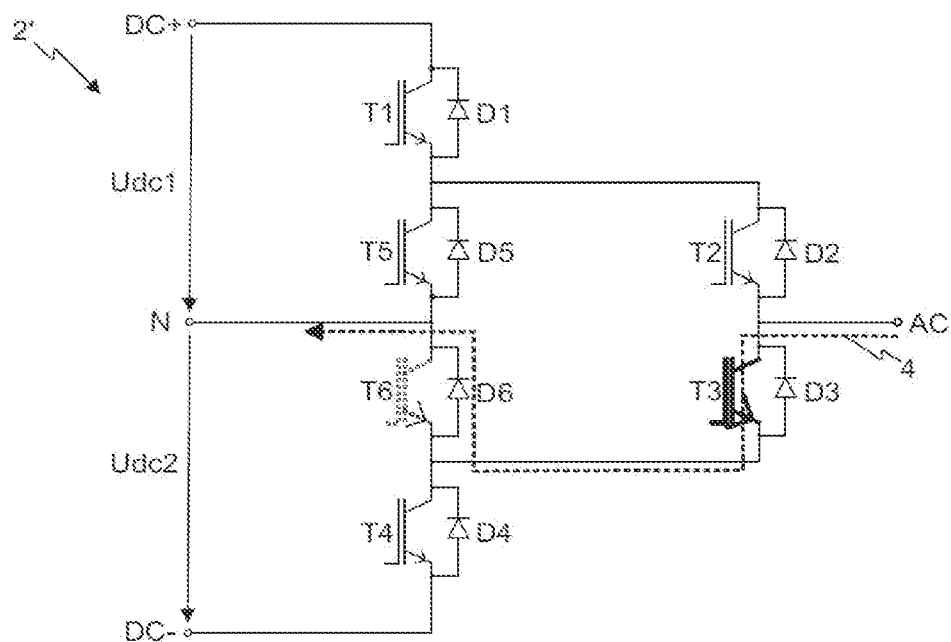
FIG. 12 shows a further switching state of the converter according to FIG. 9.
Figure 13:
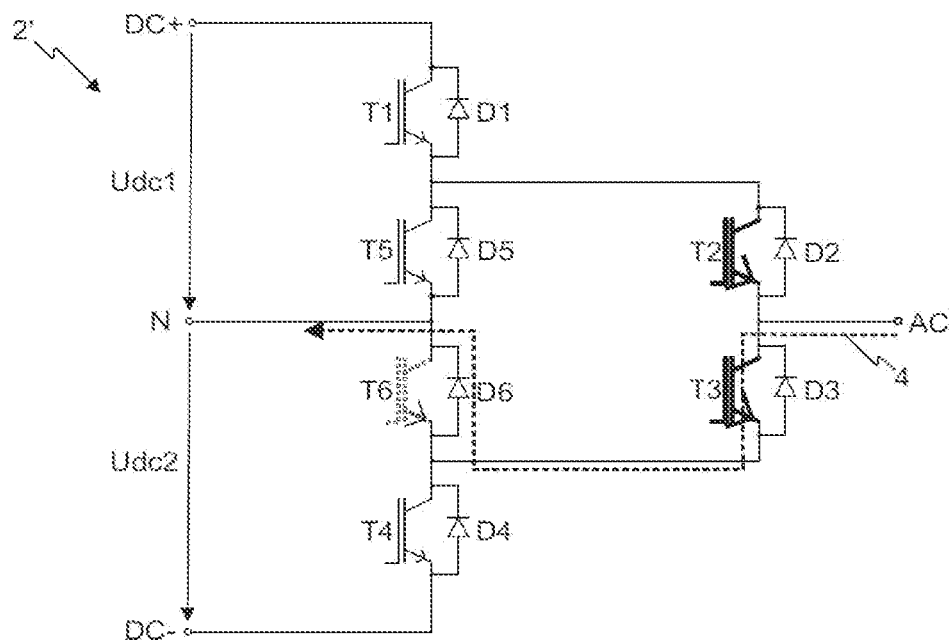
FIG. 13 shows a further switching state of the converter according to FIG. 9.
Figure 14:
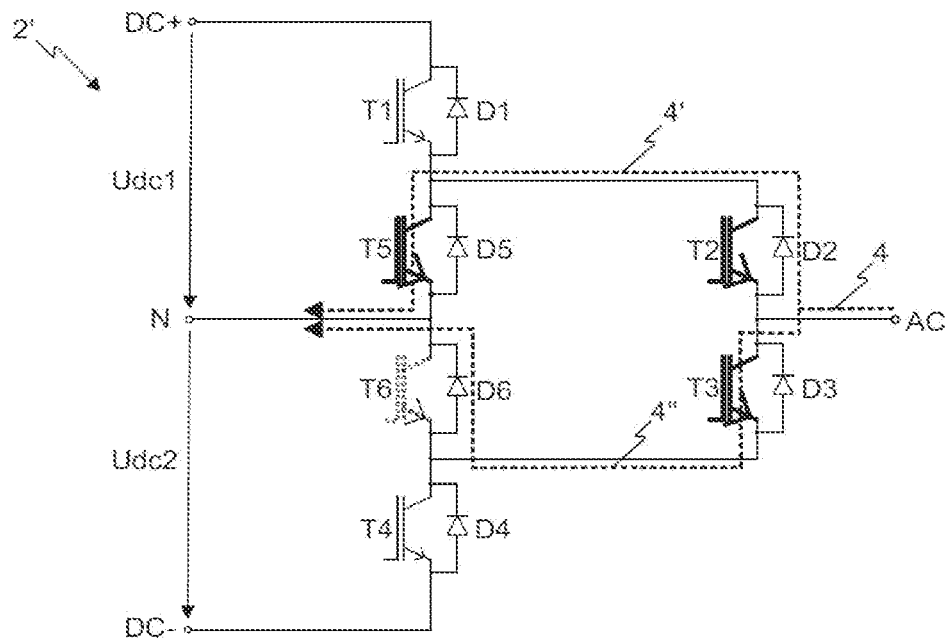
FIG. 14 shows a further switching state of the converter according to FIG. 9.
Figure 15:
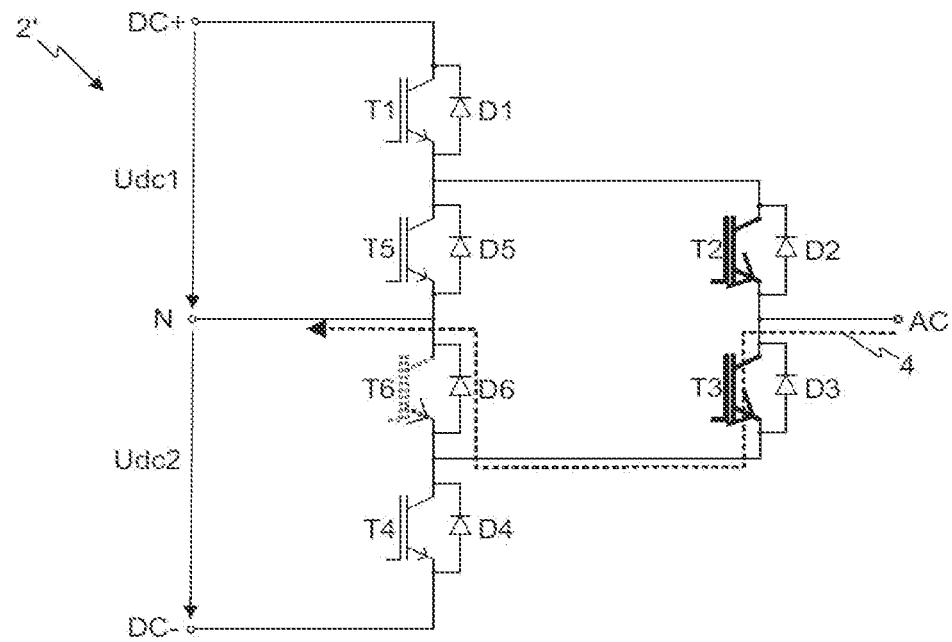
FIG. 15 shows a further switching state of the converter according to FIG. 9.
Figure 16:
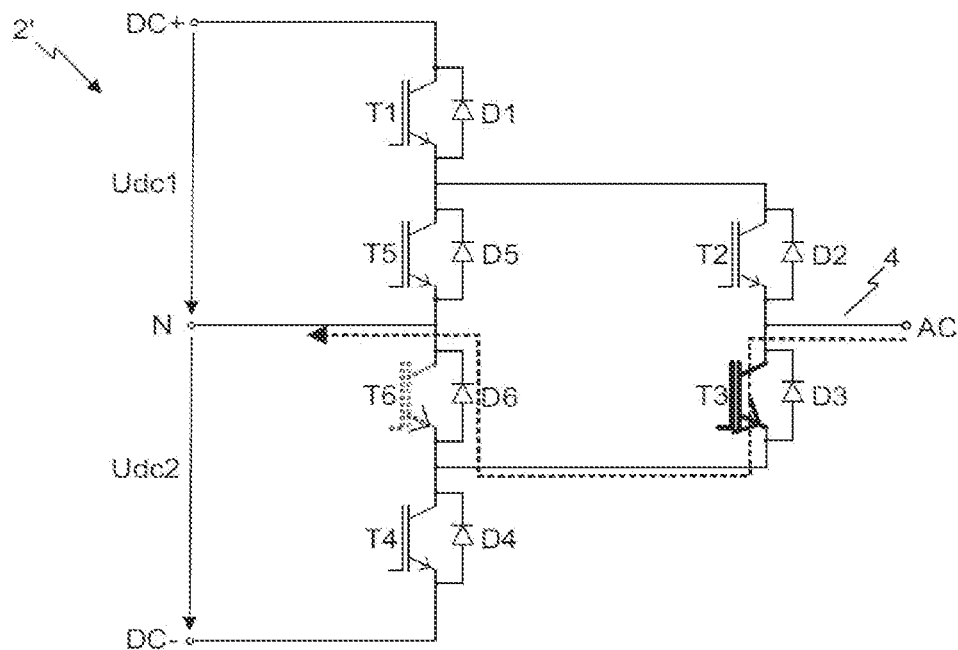
FIG. 16 shows a further switching state of the converter according to FIG. 9.
Figure 17:
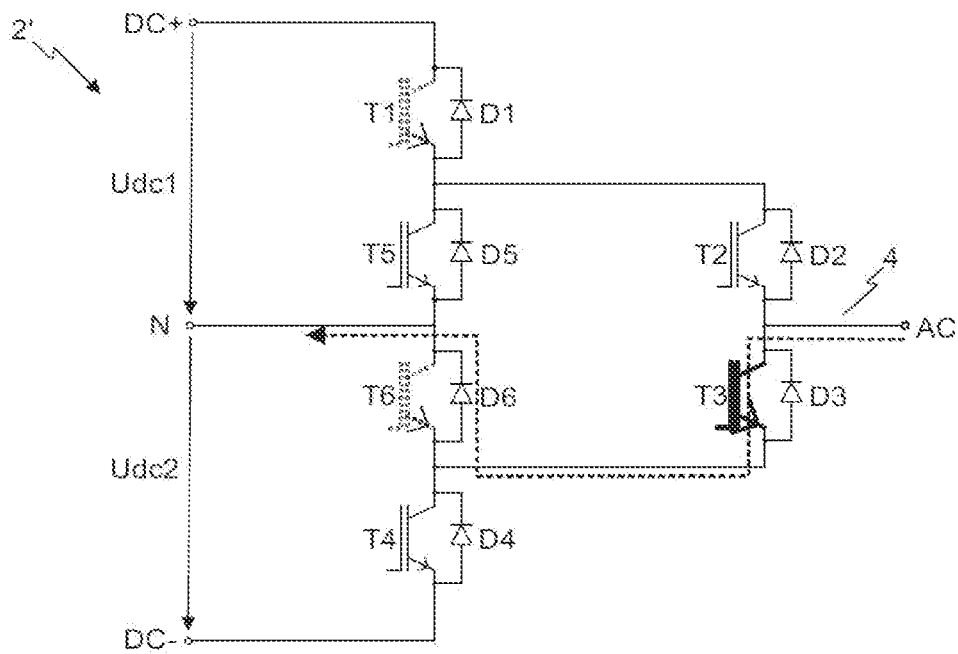
FIG. 17 shows a further switching state of the converter according to FIG. 9.

The switching state illustrated in FIG. 10 is a first converter basic switching state that is present in the first quadrant Q1 in the time periods S1 (output voltage Ua has a high positive value), and the switching state illustrated in FIG. 14 is a second converter basic switching state that is present in the first quadrant Q1 in the time periods S2 (output voltage Ua has an idealized value of zero or of approximately zero). The switching states illustrated in FIG. 11, FIG. 12 and FIG. 13 are transition states that occur in the transition from the first to the second converter basic switching state. The switching states illustrated in FIG. 15, FIG. 16 and FIG. 17 are transition switching states that occur in the transition from the second to the first converter basic switching state. The durations of the converter basic switching states are generally far longer than the durations of the transition switching states, and so the time periods of the transition switching states are not illustrated in FIG. 2.

The control device 3' is designed, starting from a first converter basic switching state (see switching state according to FIG. 10) in which the output voltage Ua is positive, the output current Ia is negative and the output current Ia flows through the first and second diode D1 and D2, to put the converter 2' into a second converter basic switching state (see switching state according to FIG. 14) by at least switching on the third power semiconductor switch T3 and switching on the fifth power semiconductor switch T5 temporally thereafter, in which the fifth and third power semiconductor switch T5 and T3 are switched on and a first portion 4' of the output current Ia flows through the second diode D2 and through the fifth power semiconductor switch T5 and a second portion 4" of the output current Ia flows through the sixth diode D6 and through the third power semiconductor switch T3.

The first and second and sixth power semiconductor switch T1, T2 and T6 may optionally be switched on in the first converter basic switching state. In this case, the second power semiconductor switch T2 is additionally switched off immediately before the third power semiconductor switch T3 is switched on. Furthermore, in this case, the first power semiconductor switch T1 is preferably switched off immediately after the third power semiconductor switch T3 has been switched on (see transition from the switching state according to FIG. 11 to the switching state according to FIG. 12).

In contrast to EP 3 301 804 A1, in which the third and fifth power semiconductor switch S3 and S5 are switched in temporal synchronicity and are thus switched on at the same time, in the invention, the third power semiconductor switch T3 is switched on firstly in time and only then is the fifth power semiconductor switch T5 switched on by the control device 3'. To this end, the control device 3' generates the drive signal for the control connection G3 for switching on the third power semiconductor switch T3 temporally before the drive signal for the control connection G5 for switching on the fifth power semiconductor switch T5. Switching losses occurring in the transition from the first to the second converter basic switching state are thereby reduced.

Switching losses occurring in the transition from the first to the second converter basic switching state may be even further reduced by virtue of the control device 3' being designed, starting from the first converter basic switching state (see switching state according to FIG. 10), to put the converter 2' into a second converter basic switching state (see switching state according to FIG. 14) by at least switching on the third power semiconductor switch T3 (this results in the switching state according to FIG. 12), by then switching on the second power semiconductor switch T2 (this results in the switching state according to FIG. 13) and by then switching on the fifth power semiconductor switch T5, in which the second, fifth and third power semiconductor switch T2, T5, T3 are switched on and a first portion 4' of the output current Ia flows through the second diode D2 and through the fifth power semiconductor switch T5 and a second portion 4" of the output current Ia flows through the sixth diode D6 and through the third power semiconductor switch T3.

In this advantageous development of the invention, after the third power semiconductor switch T3 has been switched on, the second power semiconductor switch T2 is switched on and then the fifth power semiconductor switch T5 is switched on. The second power semiconductor switch T2 is switched on virtually without switching losses, since no current flows through the second power semiconductor switch T2 other than the small and short load current that flows through the second power semiconductor switch T2 during charging of the blocking layer capacitance of the first power semiconductor switch T1. After the second power semiconductor switch T2 has been switched on, only a small voltage is present across the fifth power semiconductor switch T5, and so the fifth power semiconductor switch T5 is thereafter likewise switched on virtually without switching losses.

The control device 3 is furthermore designed, starting from the second converter basic switching state (see FIG. 14), to put the converter 2' into the first converter basic switching state (see FIG. 10) by switching off the fifth power semiconductor switch T5 (this results in the switching state according to FIG. 16) and by switching off the third power semiconductor switch T3 at least temporally thereafter. If the first power semiconductor switch T1 and the second power semiconductor switch T2 is switched on in the first converter basic switching state, the first power semiconductor switch T1 is additionally switched on by the control device 3, preferably immediately after the fifth power semiconductor switch T5 has been switched off (this results in the switching state according to FIG. 17), and the second power semiconductor switch T2 is switched on immediately after the third power semiconductor switch T3 has been switched off (see FIG. 10).

In contrast to EP 3 301 804 A1, in which the third and fifth power semiconductor switch S3 and S5 are switched in temporal synchronicity and are thus switched off at the same time, in the invention, the fifth power semiconductor switch T5 is switched off firstly in time and the third power semiconductor switch T3 is switched off thereafter by the control device 3. To this end, the control device 3 generates the drive signal for the control connection G5 for switching off the fifth power semiconductor switch T5 temporally before the drive signal for the control connection G3 for switching off the third power semiconductor switch T3. Switching losses occurring in the transition from the second to the first converter basic switching state are thereby reduced.

Switching losses occurring in the transition from the second to the first converter basic switching state may be even further reduced, if the second power semiconductor switch T2 has been switched on as described above in the transition from the first to the second converter basic switching state, by virtue of the control device 3' being designed, starting from the second converter basic switching state (see FIG. 14), to put the converter 2' into the first converter basic switching state (see FIG. 10) by switching off the fifth power semiconductor switch T5 (this results in the switching state according to FIG. 15), by then switching off the second power semiconductor switch T2 (this results in the switching state according to FIG. 16) and by switching off the third power semiconductor switch T3 at least thereafter.

In this advantageous development of the invention, after the fifth power semiconductor switch T5 has been switched off, the second power semiconductor switch T2 is switched off and then the third power semiconductor switch T3 is switched off. The fifth power semiconductor switch T5 is switched off virtually without switching losses, since virtually no voltage is present across the fifth power semiconductor switch T5 when it is switched off. The second power semiconductor switch T2 is switched off virtually without switching losses, since no current flows through the second power semiconductor switch T2 when it is switched off.

The switching procedures in the other quadrants, that is to say for the second, third and fourth quadrants Q2, Q3 and Q4, from the respective first converter basic switching state to the respective second converter basic switching state and back take place in the same way as described above with regard to the first quadrant Q1, and so the respective switching procedures according to the invention are described only briefly and without figures below for the second, third and fourth quadrants Q2, Q3 and Q4.

The control device 3' is also designed, with regard to the second, third and fourth quadrants Q2, Q3 and Q4, to drive the power semiconductor switches T1, T2, T3, T4, T5 and T6 such that the second and third power semiconductor switch T2 and T3 are switched on and off at a higher frequency than the first, fifth, sixth and fourth power semiconductor switch T1, T5, T6 and T4.

The control device 3' is designed, starting from a first converter basic switching state in which the output voltage Ua is positive, the output current Ia is positive, the first and second and sixth power semiconductor switch T1, T2 and T6 are switched on and the output current Ia flows through the first and second power semiconductor switch T1 and T2, to put the converter 2' into a second converter basic switching state by switching off the first and second power semiconductor switch T1 and T2 and switching on the second power semiconductor switch T2 temporally thereafter, in which the second and sixth power semiconductor switch T2 and T6 are switched on and a first portion of the output current Ia flows through the fifth diode D5 and through the second power semiconductor switch T2 and a second portion of the output current Ia flows through the third diode D3 and through the sixth power semiconductor switch T6. The third power semiconductor switch T3 is preferably switched on immediately after the second power semiconductor switch T2 has been switched off, and the first power semiconductor switch T1 is then switched off. Preferably, in order to reduce the switching losses in the second power semiconductor switch T2, the fifth power semiconductor switch T5 is switched on before the second power semiconductor switch T2 is switched on. The control device 3' is furthermore designed, starting from the second converter basic switching state, to put the converter 2' into the first converter basic switching state by switching off the second power semiconductor switch T2 and at least switching on the first and second power semiconductor switch T1 and T2 temporally thereafter. If the third power semiconductor switch T3 is switched on, this is switched off immediately before the second power semiconductor switch T2 is switched on.

If the fifth power semiconductor switch T5 has been switched on in the transition from the first converter basic switching state to the second converter basic switching state, as described above, in order to reduce switching losses, the fifth power semiconductor switch T5 is switched off immediately after the second power semiconductor switch T2 has been switched off.

The design of the control device 3' or the switching states for the third quadrant Q3, in which the output voltage Ua is negative and the output current Ia is positive, correspond in the same way, in mirror-image form, to the design of the control device 3' and the switching states for the first quadrant Q1, in which the output voltage Ua is positive and the output current Ia is negative. In the description given above with regard to the design of the control device 3 and with regard to the switching states for the first quadrant Q1, therefore, only the first power semiconductor switch T1 and the first diode D1 need to be swapped for the fourth power semiconductor switch T4 and the fourth diode D4, the fifth power semiconductor switch T5 and the fifth diode D5 need to be swapped for the sixth power semiconductor switch T6 and the sixth diode D6, and the second power semiconductor switch T2 and the second diode D2 need to be swapped for the third power semiconductor switch T3 and the third diode D3. With regard to the description of the design of the control device 3' and of the switching states for the third quadrant Q3, reference is thus made to the description of the design of the control device 3' and the switching states for the first quadrant Q1 in order to avoid similar duplicated descriptions.

The design of the control device 3' and of the switching states for the fourth quadrant Q4, in which the output voltage Ua is negative and the output current Ia is negative, correspond in the same way, in mirror-image form, to the design of the control device 3' and the switching states for the second quadrant Q2, in which the output voltage Ua is positive and the output current Ia is positive. In the description given above with regard to the design of the control device 3' and with regard to the switching states for the second quadrant Q2, therefore, only the first power semiconductor switch T1 and the first diode D1 need to be swapped for the fourth power semiconductor switch T4 and the fourth diode D4, the fifth power semiconductor switch T5 and the fifth diode D5 need to be swapped for the sixth power semiconductor switch T6 and the sixth diode D6, and the second power semiconductor switch T2 and the second diode D2 need to be swapped for the third power semiconductor switch T3 and the third diode D3. With regard to the description of the design of the control device 3' and of the switching states for the fourth quadrant Q4, reference is thus made to the description of the design of the control device 3' and of the switching states for the second quadrant Q2 in order to avoid similar duplicated descriptions.

Also, the inventors intend that only those claims which use the specific and exact phrase "means for" are intended to be interpreted under 35 USC 112. The structure herein is noted and well supported in the entire disclosure. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A converter device, comprising:
   a converter that has a first, second, third, fourth, fifth and sixth power semiconductor switches, which each respectively have a first and a second load current connections;
   a control device that is operatively designed to drive the power semiconductor switches;
   the second load current connection of the first power semiconductor switch is electrically conductively connected to the first load current connection of the fifth power semiconductor switch and to the first load current connection of the second power semiconductor switch,
   the second load current connection of the fifth power semiconductor switch is electrically conductively connected to the first load current connection of the sixth power semiconductor switch;
   the second load current connection of the sixth power semiconductor switch is electrically conductively connected to the first load current connection of the fourth power semiconductor switch and to the second load current connection of the third power semiconductor switch;
   the second load current connection of the second power semiconductor switch is electrically conductively connected to the first load current connection of the third power semiconductor switch;
   the converter has a first diode (D1) electrically connected in antiparallel with the first power semiconductor switch;
   a second diode is electrically connected in antiparallel with the second power semiconductor switch;
   a third diode is electrically connected in antiparallel with the third power semiconductor switch;

a fourth diode is electrically connected in antiparallel with the fourth power semiconductor switch;
a fifth diode is electrically connected in antiparallel with the fifth power semiconductor switch;
a sixth diode is electrically connected in antiparallel with the sixth power semiconductor switch and an AC potential connection (AC) that is electrically conductively connected, at a central circuit node, to the second load current connection of the second power semiconductor switch and to the first load current connection of the third power semiconductor switch, wherein, during operation of the converter, the central circuit node has an output voltage (Ua) with respect to the second load current connection of the fifth power semiconductor switch and an output current (Ia) flows from the central circuit node to the AC potential connection (AC) in a current metering direction, wherein:
the control device is operative to drive the power semiconductor switches such that the first, fifth, sixth and fourth power semiconductor switches are switched on and off at a higher frequency than the respective second and the respective third power semiconductor switches;
the control device is operative, starting from a first converter basic switching state in which the output voltage (Ua) is positive, the output current (Ia) is negative and the output current (Ia) flows through the first and second diodes, to put the converter into a second converter basic switching state by at least switching on the fifth power semiconductor switch and switching on the third power semiconductor switch temporally thereafter, in which the fifth and third power semiconductor switches (T5, T3) are switched on and a first portion of the output current (Ia) flows through the second diode and through the fifth power semiconductor switch and a second portion of the output current (Ia) flows through the sixth diode and through the third power semiconductor switch; and
the control device is operative, starting from the second converter basic switching state, to put the converter into the first converter basic switching state by switching off the third power semiconductor switch and at least switching off the fifth power semiconductor switch temporally thereafter.

2. The converter device, according to claim 1, wherein:
the control device is operatively designed, starting from the first converter basic switching state, to put the converter into a second converter basic switching state by at least switching on the fifth power semiconductor switch, by then switching on the sixth power semiconductor switch and by switching on the third power semiconductor switch temporally thereafter, in which the fifth, sixth and third power semiconductor switches are switched on and a first portion of the output current (Ia) flows through the second diode and through the fifth power semiconductor switch and a second portion of the output current (Ia) flows through the sixth diode and through the third power semiconductor switch.

3. The converter device, according to claim 2, wherein:
the control device is operatively designed, starting from the second converter basic switching state, to put the converter into the first converter basic switching state by switching off the third power semiconductor switch, by then switching off the sixth power semiconductor switch and by at least switching off the fifth power semiconductor switch temporally thereafter.

4. The converter device, according to claim 3, wherein:
the first, fifth, sixth and fourth power semiconductor switches are structured so as to have smaller switching losses than the second and third power semiconductor switches.

5. The converter device, according to claim 4, wherein:
a semiconductor material from which the first, fifth, sixth and fourth power semiconductor switches are formed from silicon carbide or gallium nitride and a semiconductor material from which the second and third power semiconductor switches are formed from silicon.

6. The converter device, according to claim 5, wherein:
a semiconductor material from which the first, fifth, sixth and fourth diode are formed from silicon carbide or gallium nitride and a semiconductor material from which the second and third diode are formed from silicon.

7. The converter device, according claim 6, wherein:
the first, fifth, sixth and fourth power semiconductor switches are designed as MOSFETs and the second and third power semiconductor switch are designed as IGBTs.

8. The converter device, according to claim 5, wherein:
the converter has a first and a second snubber capacitors;
a first connection of the first snubber capacitor is electrically conductively connected to the first load current connection of the first power semiconductor switch and a second connection of the first snubber capacitor is electrically conductively connected to the second load current connection of the fifth power semiconductor switch; and
a first connection of the second snubber capacitor is electrically conductively connected to the first load current connection of the sixth power semiconductor switch and a second connection of the second snubber capacitor is electrically conductively connected to the second load current connection of the fourth power semiconductor switch.

9. The converter, according to claim 8, wherein:
the respective first, second, third, fourth, fifth and sixth diode are designed as a discrete component or are integrated into the semiconductor body of the respective power semiconductor switch connected in antiparallel with the respective diode.

10. A converter device, comprising:
a converter that has a first, second, third, fourth, fifth and sixth power semiconductor switches, which each have a first and a second load current connections;
a control device that is designed to drive the power semiconductor switches;
the second load current connection of the first power semiconductor switch is electrically conductively connected to the first load current connection of the fifth power semiconductor switch and to the first load current connection of the second power semiconductor switch;
the second load current connection of the fifth power semiconductor switch is electrically conductively connected to the first load current connection of the sixth power semiconductor switch;
the second load current connection of the sixth power semiconductor switch is electrically conductively connected to the first load current connection of the fourth power semiconductor switch and to the second load current connection of the third power semiconductor switch;
the second load current connection of the second power semiconductor switch is electrically conductively connected to the first load current connection of the third power semiconductor switch;

wherein the converter comprises:
- a first diode electrically connected in antiparallel with the first power semiconductor switch;
- a second diode electrically connected in antiparallel with the second power semiconductor switch;
- a third diode electrically connected in antiparallel with the third power semiconductor switch;
- a fourth diode electrically connected in antiparallel with the fourth power semiconductor switch;
- a fifth diode electrically connected in antiparallel with the fifth power semiconductor switch;
- a sixth diode (D6) electrically connected in antiparallel with the sixth power semiconductor switch (T6); and
- an AC potential connection (AC) that is electrically conductively connected, at a central circuit node, to the second load current connection of the second power semiconductor switch and to the first load current connection of the third power semiconductor switch, wherein, during operation of the converter, the central circuit node has an output voltage (Ua) with respect to the second load current connection of the fifth power semiconductor switch and an output current (Ia) flows from the central circuit node to the AC potential connection (AC) in a current metering direction;

wherein the control device (3') is operative to drive the power semiconductor switches such that the second and third power semiconductor switch are switched on and off at a higher frequency than the first, fifth, sixth and fourth power semiconductor switches;

wherein the control device is designed, starting from a first converter basic switching state in which the output voltage (Ua) is positive, the output current (Ia) is negative and the output current (Ia) flows through the first and second diodes, to put the converter into a second converter basic switching state by at least switching on the third power semiconductor switch and switching on the fifth power semiconductor switch temporally thereafter, in which the fifth and third power semiconductor switches are switched on and a first portion of the output current (Ia) flows through the second diode and through the fifth power semiconductor switch and a second portion of the output current (Ia) flows through the sixth diode and through the third power semiconductor switch; and wherein the control device is designed, starting from the second converter basic switching state, to put the converter into the first converter basic switching state by switching off the fifth power semiconductor switch and by switching off the third power semiconductor switch at least temporally thereafter.

11. The converter device, according to claim 10, wherein:
the control device is operative, starting from the first converter basic switching state, to put the converter into a second converter basic switching state by at least switching on the third power semiconductor switch, by subsequently switching on the second power semiconductor switch and by then switching on the fifth power semiconductor switch, in which the second, fifth and third power semiconductor switches are switched on and a first portion of the output current (Ia) flows through the second diode and through the fifth power semiconductor switch and a second portion of the output current (Ia) flows through the sixth diode and through the third power semiconductor switch.

12. The converter device, according to claim 11, wherein:
the control device is operative, starting from the second converter basic switching state, to put the converter into the first converter basic switching state by switching off the fifth power semiconductor switch, by then switching off the second power semiconductor switch and by at least then switching off the third power semiconductor switch.

13. The converter device, according to claim 12, wherein:
the second and third power semiconductor switches have smaller switching losses than the first, fifth, sixth and fourth power semiconductor switches.

14. The converter device, according to claim 13, wherein:
a semiconductor material from which the second and third power semiconductor switch are formed from silicon carbide or gallium nitride and the semiconductor material from which the first, fifth, sixth and fourth power semiconductor switches are formed from silicon.

15. The converter device, according to claim 14, wherein:
a semiconductor material from which the second and third diodes are formed from silicon carbide or gallium nitride and the semiconductor material from which the first, fifth, sixth and fourth diodes are formed from silicon.

16. The converter device, according to claim 15, wherein:
the first, fifth, sixth and fourth power semiconductor switches are designed as IGBTs and the second and third power semiconductor switches are designed as MOSFETs.

17. The converter device, according to claim 16, wherein:
the respective first, second, third, fourth, fifth and sixth diodes are designed as a discrete component or are integrated into the semiconductor body of the respective power semiconductor switches connected in antiparallel with the respective diodes.

* * * * *